United States Patent
Stefan et al.

(10) Patent No.: US 8,033,832 B1
(45) Date of Patent: Oct. 11, 2011

(54) SYSTEMS AND METHODS FOR PERFORMING VIRTUAL COSMETIC AND RECONSTRUCTIVE SURGERY

(76) Inventors: David B. Stefan, Chesapeake, VA (US); David A. Gilbert, Virginia Beach, VA (US)

( * ) Notice: Subject to any disclaimer, the term of this patent is extended or adjusted under 35 U.S.C. 154(b) by 1806 days.

(21) Appl. No.: 11/023,785

(22) Filed: Dec. 27, 2004

(51) Int. Cl.
*G09B 23/28* (2006.01)

(52) U.S. Cl. ........................ 434/267; 382/128

(58) Field of Classification Search .......... 434/262–275; 382/128, 130; 600/424, 407, 426, 427; 703/6; 128/898
See application file for complete search history.

(56) References Cited

U.S. PATENT DOCUMENTS

| | | | |
|---|---|---|---|
| 5,687,737 A | 11/1997 | Branham et al. | |
| 5,704,791 A | 1/1998 | Gillio | |
| 5,854,850 A * | 12/1998 | Linford et al. | 382/128 |
| 5,882,206 A | 3/1999 | Gillio | |
| 6,081,611 A * | 6/2000 | Linford et al. | 382/128 |
| 6,161,080 A | 12/2000 | Aouni-Ateshian et al. | |
| 6,190,320 B1 | 2/2001 | Lelong | |
| 6,272,761 B1 * | 8/2001 | Pechter | 33/512 |
| 6,556,236 B1 | 4/2003 | Swift et al. | |
| 6,608,628 B1 | 8/2003 | Ross et al. | |
| 6,711,432 B1 * | 3/2004 | Krause et al. | 600/427 |
| 6,968,075 B1 * | 11/2005 | Chang | 382/111 |
| 7,121,832 B2 * | 10/2006 | Hsieh et al. | 434/262 |
| 7,218,752 B2 * | 5/2007 | Tsai et al. | 382/100 |
| 2002/0009214 A1 * | 1/2002 | Arima et al. | 382/128 |
| 2002/0035458 A1 * | 3/2002 | Kim et al. | 703/6 |
| 2002/0064302 A1 * | 5/2002 | Massengill | 382/128 |
| 2002/0092534 A1 * | 7/2002 | Shamoun | 128/898 |
| 2002/0181752 A1 * | 12/2002 | Wallo et al. | 382/130 |
| 2003/0023156 A1 | 1/2003 | Pappas et al. | |
| 2004/0030245 A1 * | 2/2004 | Noble et al. | 600/426 |
| 2004/0146191 A1 * | 7/2004 | Lu | 382/128 |
| 2005/0284215 A1 * | 12/2005 | Falsetti | 73/149 |
| 2006/0097422 A1 * | 5/2006 | Diamond | 264/222 |

OTHER PUBLICATIONS

Mateo, J.M. et al.; Innovative New Concepts in Augmentative Breast Surgery. Part II: Systematic and Drawing; Aesthetic Plastic Surgery, vol. 25, No. 6; Nov. 2001; pp. 436-442.*

* cited by examiner

*Primary Examiner* — Xuan Thai
*Assistant Examiner* — Timothy A Musselman
(74) *Attorney, Agent, or Firm* — Wooten & Shaddock, PLC

(57) ABSTRACT

The virtual surgery systems and methods that provide for the prediction, evaluation, and validation of certain cosmetic and reconstructive surgical procedures. The virtual surgery systems and methods allow a user to predict, evaluate, and validate various breast reduction surgical procedures.

13 Claims, 19 Drawing Sheets

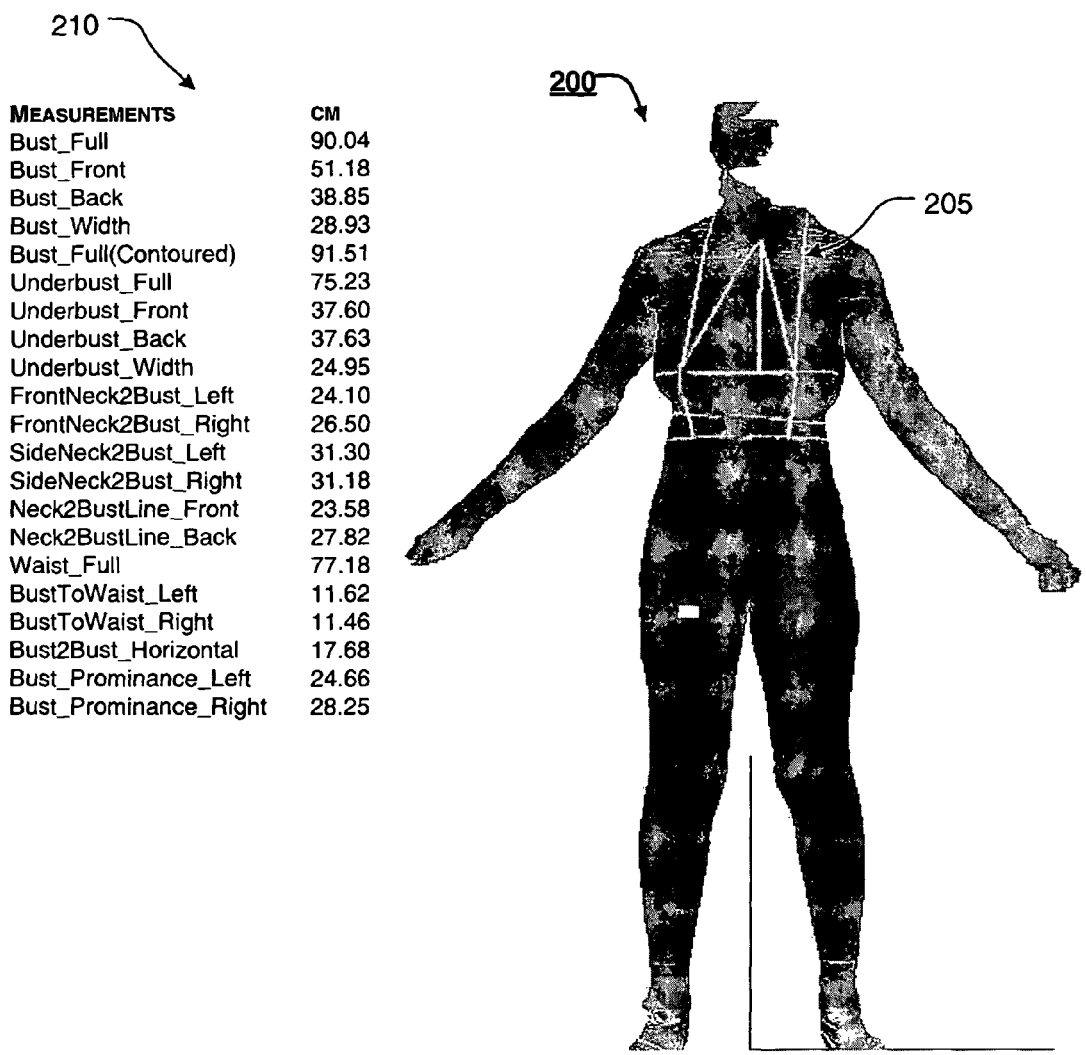

| MEASUREMENTS | CM |
|---|---|
| Bust_Full | 90.04 |
| Bust_Front | 51.18 |
| Bust_Back | 38.85 |
| Bust_Width | 28.93 |
| Bust_Full(Contoured) | 91.51 |
| Underbust_Full | 75.23 |
| Underbust_Front | 37.60 |
| Underbust_Back | 37.63 |
| Underbust_Width | 24.95 |
| FrontNeck2Bust_Left | 24.10 |
| FrontNeck2Bust_Right | 26.50 |
| SideNeck2Bust_Left | 31.30 |
| SideNeck2Bust_Right | 31.18 |
| Neck2BustLine_Front | 23.58 |
| Neck2BustLine_Back | 27.82 |
| Waist_Full | 77.18 |
| BustToWaist_Left | 11.62 |
| BustToWaist_Right | 11.46 |
| Bust2Bust_Horizontal | 17.68 |
| Bust_Prominance_Left | 24.66 |
| Bust_Prominance_Right | 28.25 |

*FIG. 2*

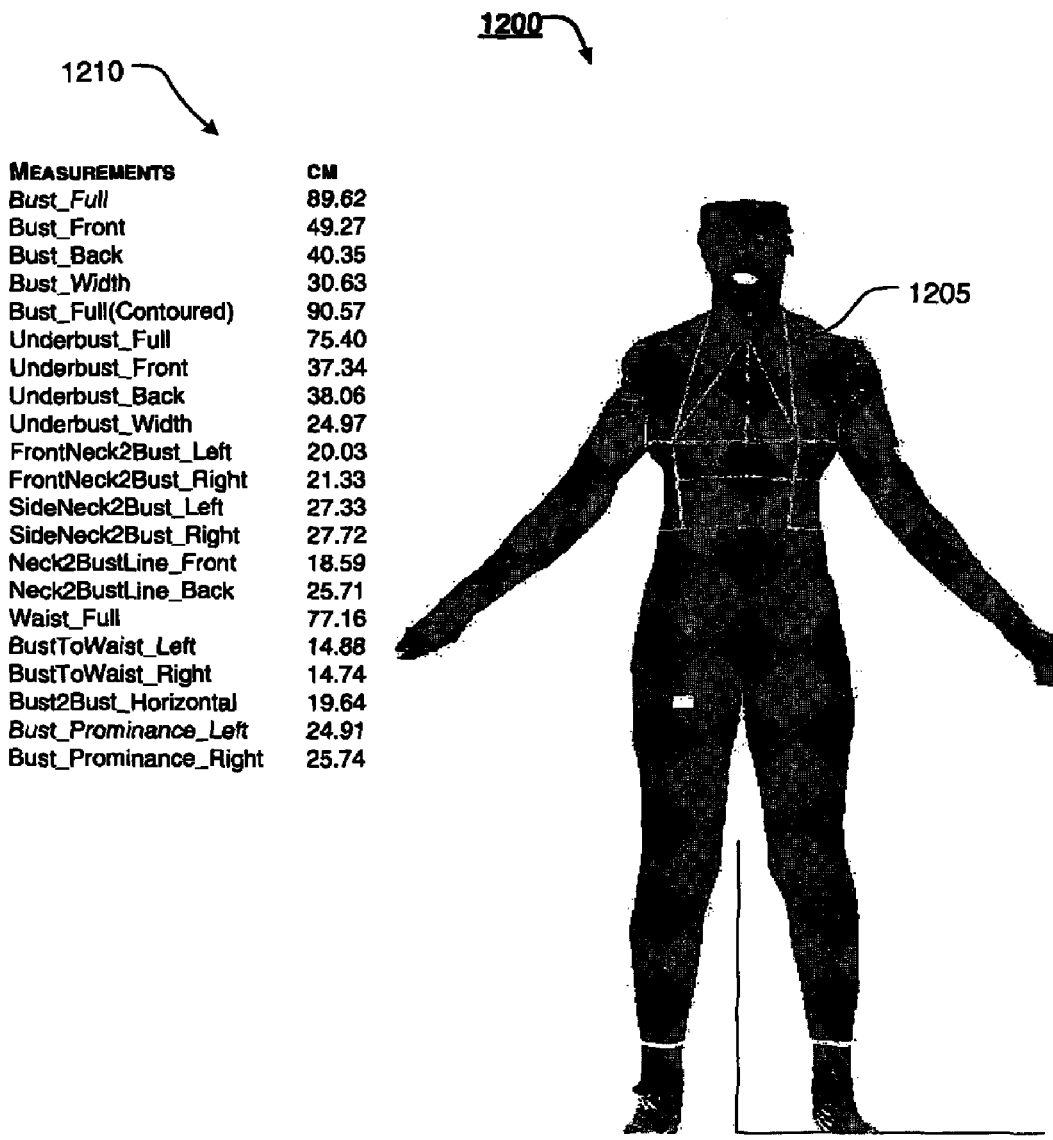

| MEASUREMENTS | CM |
|---|---|
| Bust_Full | 89.62 |
| Bust_Front | 49.27 |
| Bust_Back | 40.35 |
| Bust_Width | 30.63 |
| Bust_Full(Contoured) | 90.57 |
| Underbust_Full | 75.40 |
| Underbust_Front | 37.34 |
| Underbust_Back | 38.06 |
| Underbust_Width | 24.97 |
| FrontNeck2Bust_Left | 20.03 |
| FrontNeck2Bust_Right | 21.33 |
| SideNeck2Bust_Left | 27.33 |
| SideNeck2Bust_Right | 27.72 |
| Neck2BustLine_Front | 18.59 |
| Neck2BustLine_Back | 25.71 |
| Waist_Full | 77.16 |
| BustToWaist_Left | 14.88 |
| BustToWaist_Right | 14.74 |
| Bust2Bust_Horizontal | 19.64 |
| Bust_Prominance_Left | 24.91 |
| Bust_Prominance_Right | 25.74 |

FIG. 12

| Measurements, cm | Pre-Op | Forecasted | Δ | 1 Mo. Post-Op | Δ from Forecast | Δ from Pre-Op | Comment |
|---|---|---|---|---|---|---|---|
| Bust_Full | 90.04 | 89.62 | -0.42 | 90.27 | 0.66 | 0.24 | |
| Bust_Front | 51.18 | 49.28 | -1.91 | 49.77 | 0.49 | -1.42 | |
| Bust_Back | 38.85 | 40.34 | 1.49 | 40.51 | 0.16 | 1.65 | |
| Bust_Width | 28.93 | 30.63 | 1.70 | 30.02 | -0.60 | 1.09 | |
| Bust_Full (Contoured) | 91.51 | 90.57 | -0.94 | 91.57 | 1.00 | 0.06 | |
| Underbust_Full | 75.23 | 75.40 | 0.17 | 75.69 | 0.29 | 0.46 | |
| Underbust_Front | 37.60 | 37.35 | -0.25 | 37.08 | -0.26 | -0.52 | |
| Underbust_Back | 37.63 | 38.05 | 0.43 | 38.60 | 0.55 | 0.98 | |
| Underbust_Width | 24.95 | 24.97 | 0.02 | 26.05 | 1.08 | 1.11 | |
| FrontNeck2Bust_Left | 24.10 | 20.03 | -4.07 | 20.20 | 0.17 | -3.90 | |
| FrontNeck2Bust_Right | 26.50 | 21.33 | -5.17 | 20.66 | -0.67 | -5.84 | |
| SideNeck2Bust_Left | 31.30 | 27.33 | -3.97 | 25.93 | -1.40 | -5.37 | |
| SideNeck2Bust_Right | 31.18 | 27.72 | -3.46 | 25.80 | -1.92 | -5.38 | |
| Neck2BustLine_Front | 23.58 | 18.59 | -4.99 | 18.41 | -0.18 | -5.17 | |
| Neck2BustLine_Back | 27.82 | 25.71 | -2.10 | 25.21 | -0.50 | -2.61 | |
| Waist_Full | 77.18 | 77.16 | -0.02 | 77.47 | 0.31 | 0.29 | |
| BustToWaist_Left | 11.62 | 14.88 | 3.26 | 18.32 | 3.44 | 6.70 | |
| BustToWaist_Right | 11.46 | 14.74 | 3.28 | 18.21 | 3.47 | 6.75 | |
| Bust2Bust_Horizontal | 17.68 | 19.64 | 1.96 | 18.38 | -1.26 | 0.70 | |
| Bust_Prominance_Left | 24.66 | 24.91 | 0.25 | 25.55 | 0.64 | 0.90 | |
| Bust_Prominance_Right | 28.25 | 25.74 | -2.50 | 26.01 | 0.27 | -2.23 | |

*FIG. 15*

Pre-op Scan         Forecasted Model         Post-op Scan
  
FIG. 18
Pre-op Scan         Forecasted Model         Post-op Scan
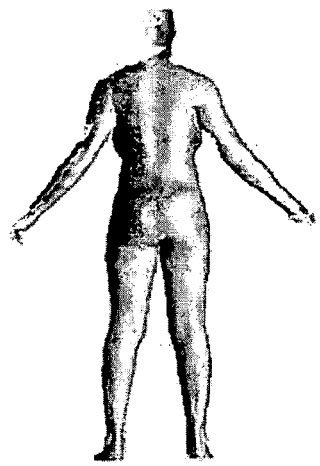 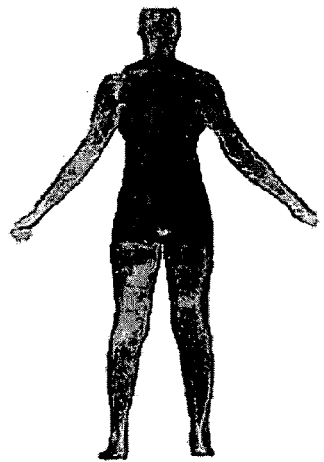 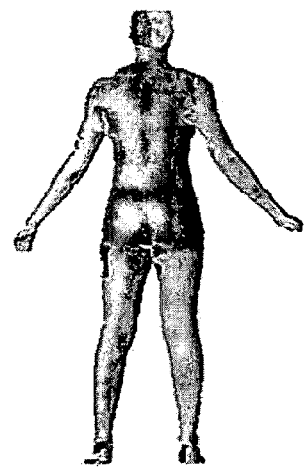
FIG. 19

Pre-op Scan　　Forecasted Model　　Post-op Scan

Pre-op Scan　　Forecasted Model　　Post-op Scan

SYSTEMS AND METHODS FOR PERFORMING VIRTUAL COSMETIC AND RECONSTRUCTIVE SURGERY

BACKGROUND OF THE INVENTION

Field of the Invention

This invention relates generally to cosmetic and reconstructive surgery. In particular, the present invention relates to virtual cosmetic and reconstructive surgery systems and methods.

SUMMARY OF THE INVENTION

Known methods for evaluating patients and potential patients for cosmetic and reconstructive surgery are not able to provide the patients and potential patients with accurate forecasting or modeling of expected results and outcomes. Furthermore, known methods fail to provide surgeons with accurate forecasting or modeling of a cosmetic or reconstructive surgical procedure.

The virtual surgery systems and methods of this invention allow a user to measure, quantify, predict, evaluate, and validate various cosmetic and reconstructive surgical procedures. In an illustrative, non-limiting embodiment of this invention, the virtual surgery systems and methods allow a user to predict, evaluate, and validate various reduction mammoplasty and mastopexy (breast reduction) surgical procedures.

In general, breast reduction surgery is the act of removing breast tissue, relocating the nipple areolar complex, and shaping the remaining breast tissue to achieve an aesthetically attractive shape. It is a functional surgery that serves to alleviate back pain, chafing, rash, difficult hygiene maintenance, or other discomfitures that the pre-operative subject may experience.

In an illustrative, non-limiting embodiment of this invention, the virtual surgery systems and methods of this invention provide a virtual surgery suite, which can be utilized to build forecasted models of a pending cosmetic or reconstructive surgical procedure, such as a breast reduction. For a breast reduction procedure, the inventive virtual surgery suite can provide volumetric reduction information for each of the pre-operative subject's breasts, which may act as a guide to the operating surgeon before and during the actual surgical procedure.

In various exemplary embodiments of this invention, the virtual surgery systems and methods of this invention also provide for simultaneous virtual surgery in the operating room, or over a remote link, while the operating surgeon is performing the actual surgery. Simultaneous virtual surgery facilitates "virtual exploratory surgery", allowing the surgeon to ask "what-if" questions about, for example, additional tissue removal. The virtual surgeon can volumetrically reduce (or add to) the forecasted model using the appropriate native three-dimensional (3D) data modeling language, such as, for example, Virtual Reality Modeling Language (VRML) image editing tools. Volume reductions are reported in, for example, cubic centimeters. Formula adaptation allows for approximating the grams of tissue to be removed from the body part under examination by the operating surgeon.

Thus, proposed changes can be evaluated by the operating surgeon for functional as well as aesthetic appeal. The operating surgeon may then act on the proposed changes to the forecasted model, or elect not to utilize the additional information provided by the virtual surgeon.

After a surgical procedure is performed, postoperative scans of the patient are compared to the forecasted models for validation purposes. The postoperative scan or scans may be added to the catalog of postoperative patients.

In an illustrative, non-limiting embodiment of this invention, the pre-operative subject is first scanned using a 3D body scanner. The pre-operative image generated by the scanner is a dimensionally accurate 3D image of the pre-operative subject's body habitus. Specific measurements relating to evaluating the pre-operative subject's body contours and breasts are then made using a procedure-specific measurement extraction template. The pre-operative scanned image and associated measurements are stored for later retrieval and analysis and form the beginning of the subject's data archive.

The virtual surgeon produces the forecasted model of the subject's pending breast reduction procedure using the subject's pre-operative 3D scanned image. The forecasted image can be translated back into a format that can be measured by the scanner software, as if the procedure has already taken place. The forecasted model is produced prior to the actual surgery and yields volumetric reduction information, which the operating surgeon can utilize as a guide for the pending breast reduction surgery. This forecasted model is placed into the subject's data archive and can be used as a consultation tool between the patient and the operating surgeon prior to the actual surgery.

If the virtual surgeon and operating surgeon work simultaneously in the operating room, or over a remote link, the virtual surgeon can manipulate the forecasted model during the actual breast reduction procedure, should the operating surgeon deviate from the forecasted model's guidelines, or wish to explore additional tissue removal. The virtual surgeon then produces a modified forecasted model that reflects the results of the actual surgery. This modified forecasted model is placed into the subject's data archive. Deviations are noted and explained between the forecasted model and the modified forecasted model and placed into the subject's data archive.

The modified forecasted model (if any) is then converted into a format that can be measured by the scanner software. Measurements of the modified forecasted model are captured and recorded in the subject's data archive.

In various exemplary embodiments, the post-operative subject is scanned at least once, and often on a periodic, repetitive basis.

In various exemplary embodiments, the post-operative subject's scan is placed into the subject's data archive. The post-operative scan is measured and compared to the forecasted model, modified forecasted model (if any) and pre-operative subject's scanned image. Results are compared, analyzed, documented, and commented upon, with any explanations or causes for deviations noted in the appropriate fields of the subject's data archive.

The pre-operative, forecasted, modified forecasted (if any) and the post-operative subject scan VRML model files are read into a software program that allows simultaneous visual comparisons at multiple view angles. These images are created and optionally placed into the subject's data archive.

Accordingly, this invention provides virtual surgery systems and methods, which are capable of evaluating patients and potential patients for cosmetic and reconstructive surgery.

This invention separately provides virtual surgery systems and methods, which provide patients and potential patients for cosmetic and reconstructive surgery with accurate forecasting and modeling of expected results and outcomes.

This invention separately provides a virtual surgery suite, which allows a user to predict, evaluate, and validate various cosmetic and reconstructive surgical procedures.

This invention separately provides a virtual surgery suite, which allows for simultaneous virtual surgery by a virtual surgeon and actual surgery by an operating surgeon.

This invention separately provides a virtual surgery suite, which allows "virtual exploratory surgery" to be performed during a surgical procedure.

This invention separately provides a virtual surgery suite, which provides virtual surgical tools and instruments, including a "digital scalpel".

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 2 shows an exemplary embodiment of a scan of the pre-operative breast reduction subject and certain of the associated measurements extracted from the scanned image using a specific measurement extraction profile, according to this invention;

FIG. 12 shows an exemplary embodiment of a forecasted breast reduction model converted to the scanner format, with certain appropriate measurements extracted, according to this invention;

FIG. 15 shows an exemplary embodiment of a measurement comparison table for the subject's pre-operative scan, forecasted model image, and 1 month post-operative scan, according to this invention;

FIG. 18 shows an exemplary embodiment of a composite view of the pre-operative, forecasted, and post-operative image of the subject rotated 90 degrees, according to this invention;

FIG. 19 shows an exemplary embodiment of a composite view of the pre-operative, forecasted, and post-operative image of the subject rotated 180 degrees, according to this invention;

DETAILED DESCRIPTION OF AN EXEMPLARY EMBODIMENT

For simplicity and clarification, the design factors and operating principles of the virtual surgery systems and methods according to this invention are explained with reference to various exemplary embodiments of virtual surgery systems and methods according to this invention. The basic explanation of the design factors and operating principles of the virtual surgery systems and methods is applicable for the understanding, design, and operation of the virtual surgery systems and methods of this invention.

Furthermore, it should be appreciated that, for simplicity and to clarification, the embodiments of this invention will be described with reference to the prediction, evaluation, and validation of an exemplary breast reduction surgical procedure. However, it should be appreciated that the virtual surgery systems and methods of this invention may be utilized in various other cosmetic and reconstructive surgical procedures, wherein tissue or fluid is to be removed from or added to a subject, when the subject's body contours are altered or manipulated.

Thus, it should be appreciated that the systems and methods of this invention may be implemented to predict, evaluate, and validate any type of body contouring, cosmetic, or reconstructive surgical procedures.

It should also be appreciated that, for simplicity and clarification, the embodiments of this invention will be described with reference to the use of VRML image editing tools to manipulate various scan images and/or models. However, it should be appreciated that the virtual surgery systems and methods of this invention may utilize any appropriate native 3D data modeling language, such as, for example VRML, Amapi, 3D Studio, Wavefront, STL, IGES, AutoCAD, Open Inventor, Illustrator, or any known or later developed 3D data modeling language capable of being used to manipulate the various scan images and/or models.

It should also be appreciated that the term "virtual surgery" is for basic explanation and understanding of the operation of the virtual surgery systems and methods of this invention. Therefore, the term "virtual surgery" is not to be construed as limiting the virtual surgery systems and methods of this invention.

Figure 1A:
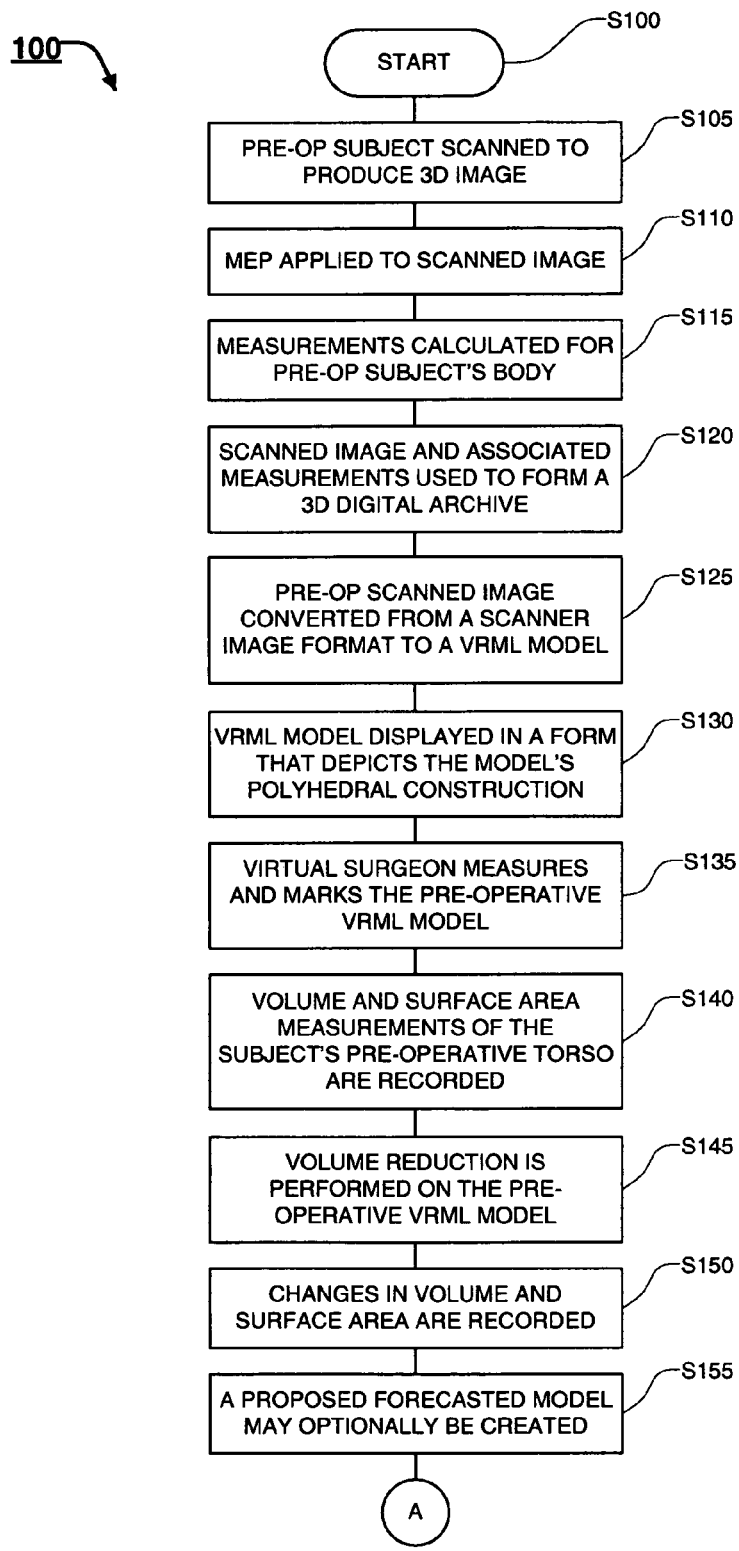
FIGS. 1A and 1B show a flowchart outlining one exemplary embodiment of a method for performing virtual surgery according to this invention.
Figure 1B:
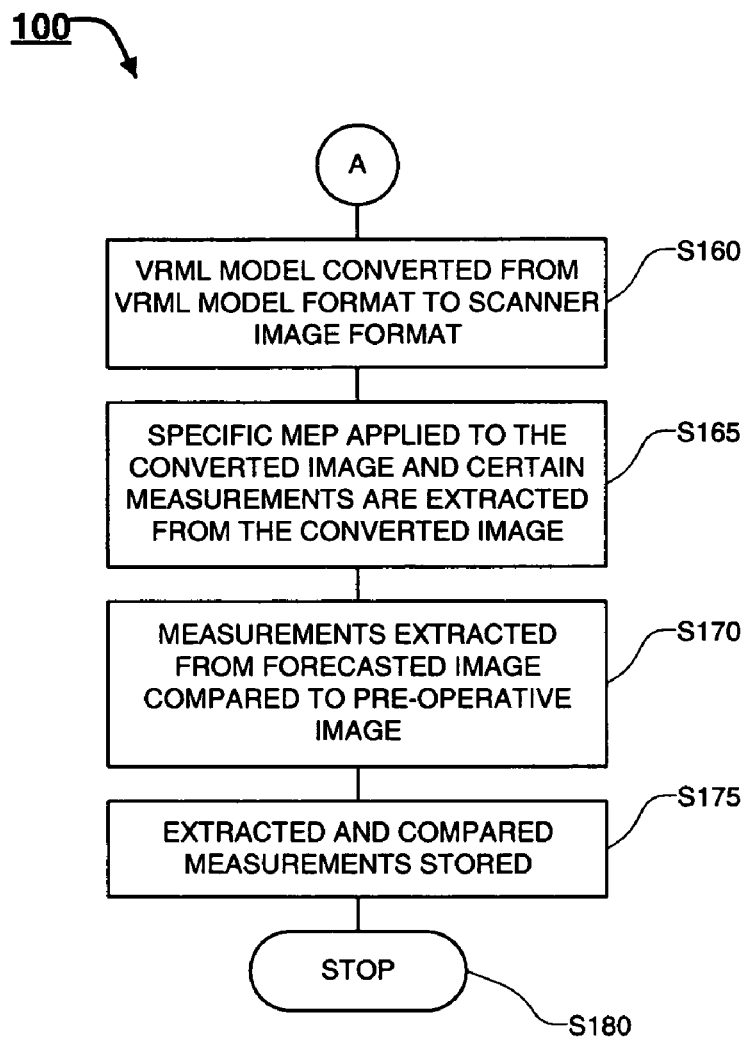

FIGS. 1A and 1B show a flowchart 100 outlining one illustrative, non-limiting embodiment of a method for performing virtual surgery according to this invention.

As shown in FIGS. 1A and 1B, the exemplary method begins in step S100 and continues to Step S105 wherein a pre-operative subject's body is scanned to produce a highly accurate, dimensionally correct, 3D image of the pre-operative subject's body. In various exemplary embodiments, a white light scanner is used to produce the scanned image. However, it should be appreciated that in various exemplary embodiments, and laser, ultrasonic, or other appropriate scanner, capable of providing a highly accurate, dimensionally correct, 3D image of the pre-operative subject's body may be used.

Then, in Step S110, a specific Measurement Extraction Profile (MEP) is applied to the pre-operative subject's scanned image to extract measurements pertinent to evaluating the subject's body/breast contours prior to the pending surgery. This MEP file contains instructions for determining specific measurements of the pre-operative subject's scanned image.

Next, in Step S115, the MEP file is used to calculate key measurements pertinent to evaluating the subject's body/breast contours prior to the pending surgery, such as, for example, circumferential measurements of the patient's breasts, waist, hips, abdomen, and stomach. Additionally, certain linear or straight line measurements are calculated for the chest, bust, underbust, waist, hips, abdomen, and stomach.

FIG. 2 shows a first exemplary embodiment of a scanned pre-operative image 200 of a pre-operative breast reduction subject with measurement lines 205 according to this invention. As shown in FIG. 2, the subject has asymmetric breasts, with the left breast being noticeably larger than the right breast.

As shown in FIG. 2, a pre-operative subject's body has been scanned to produce a highly accurate, dimensionally correct, 3D image 200 of the pre-operative subject's body. In various exemplary embodiments, a white light scanner is used to produce the scanned image 200. However, it should be appreciated that in various exemplary embodiments, a laser scanner, an ultrasonic imager, or any other known or later developed device useable for producing a highly accurate, dimensionally correct, 3D image of the pre-operative subject's body may be used.

As further shown in FIG. 2, a specific MEP has been applied to the scanned image 200 and certain measurement lines 205 have been applied to the pre-operative scanned image 200 at, for example, the patient's chest, bust, underbust, waist, hips, abdomen, and stomach.

The chart 210, as also shown in FIG. 2, shows an exemplary summary of certain of the pre-operative measurements extracted from the pre-operative image 200 using the specialized MEP.

Next, in Step S120, the scanned image and associated measurements of the pre-operative subject are used to form a data archive, or database, for the subject.

In various exemplary embodiments, additional information may be stored in the subject's data archive. For example, information regarding the subject's age, any relevant medical data that indicates special conditions that the subject may have that could eliminate the subject for consideration, and the like.

In Step S125, the subject's pre-operative scanned image is converted from the scanned image format to a Pre-operative VRML model format and imported into a VRML editor.

Figure 3:
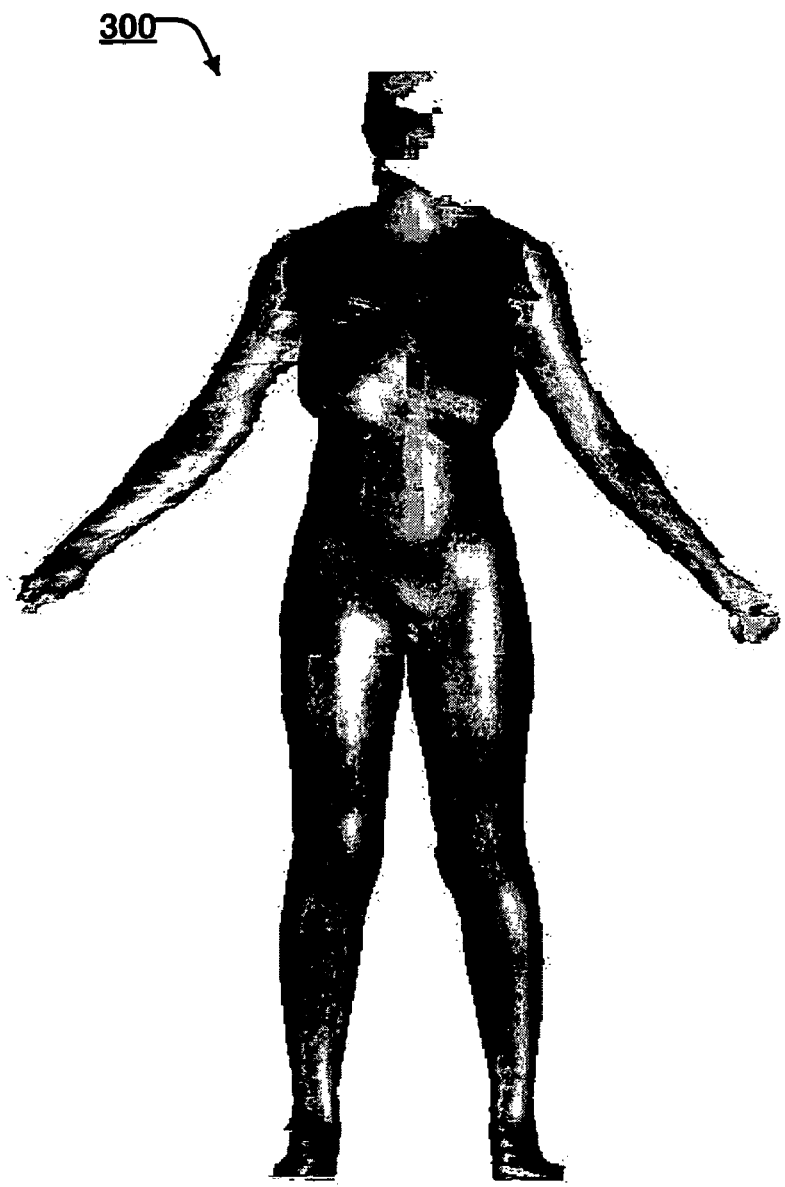
FIG. 3 shows an exemplary embodiment of a smoothed representation of the scanned image in VRML format, according to this invention.

FIG. 3 shows an exemplary embodiment of a smoothed representation of the scanned image in VRML format. The Pre-operative VRML model 300 is a dimensionally accurate 3D representation of the pre-operative subject.

In Step S130, the subject's Pre-operative VRML model is converted to a form that depicts the image as a representation of points, edges, and facets that comprise the image's polyhedral construction and displayed.

Collectively, the points, edges, and facets mathematically represent the patient's body contours. Manipulation of these points, edges, and facets changes the subject image's body contours, resulting in recordable changes to the image's surface area and volume. Contiguous edges in a particular direction are known as splines. Consequent manipulation of points, edges, and facets change a spline's contour. Proper alignment of each spline dictates the 3D image's appearance.

Figure 4:
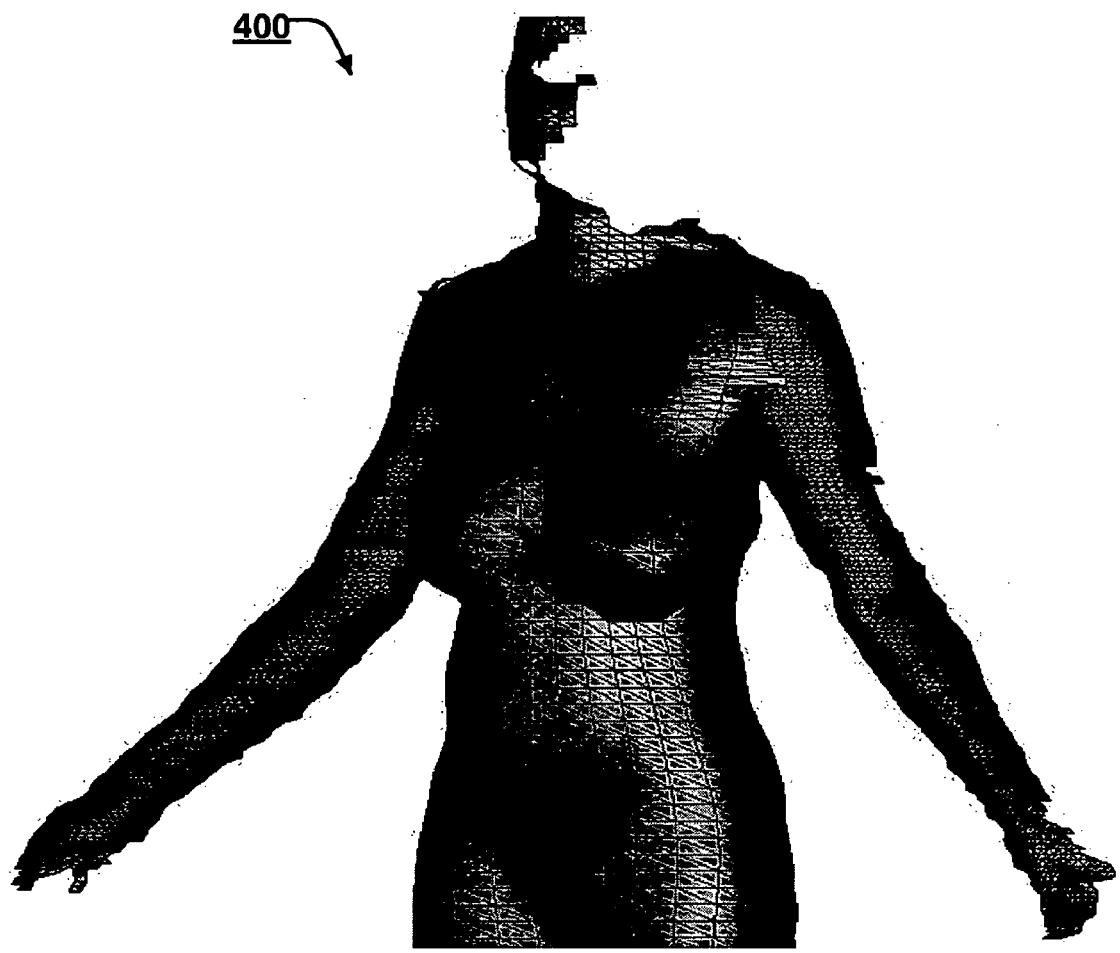
FIG. 4 shows an exemplary embodiment of the pre-operative subject's VRML model in a form that depicts the image as a representation of points, edges, and facets that comprise the image's polyhedral construction, according to this invention.

FIG. 4 depicts the subject's pre-operative VRML model in a form that depicts the image as a representation of points, edges, facets, and splines. In FIG. 4, the image 400 shows a view of the pre-operative subject's torso and arms.

Next, in Step S135, the systems and methods of this invention allow a virtual surgeon to measure and mark the subject's pre-operative VRML model in preparation for producing a forecasted breast reduction model. These markings form the basis for volumetric reductions to be performed on each breast by the operating surgeon.

Figure 5:
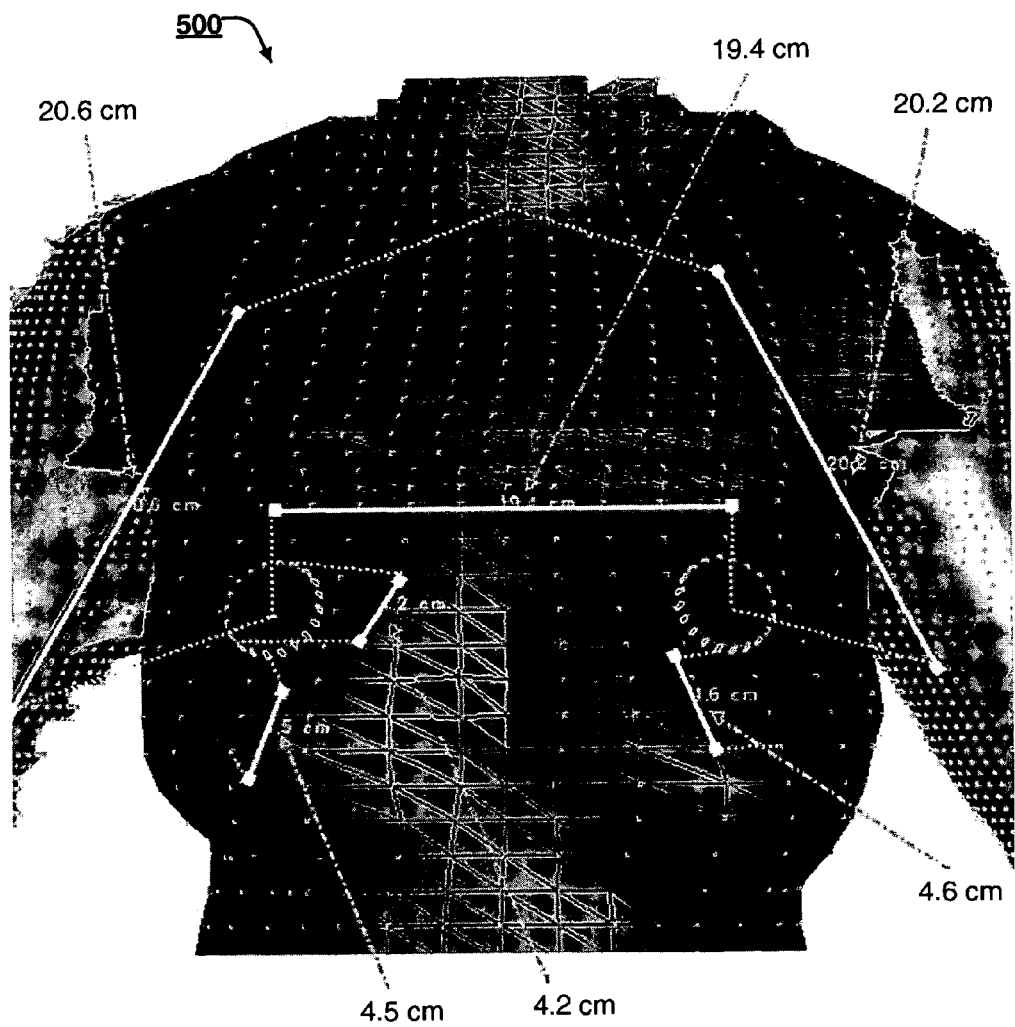
FIG. 5 shows an exemplary embodiment of the subject's pre-operative VRML model marked with the virtual breast reduction pattern and certain of certain of the associated measurements, according to this invention.

FIG. 5 shows an exemplary embodiment of the subject's pre-operative VRML model 500 marked with the virtual breast reduction pattern and certain of the associated measurements, according to this invention. In various exemplary embodiments, the virtual surgeon measures and marks the subject's pre-operative VRML model using patterns similar to those used by operating surgeons when they physically "mark-up" the subject prior to the pending breast reduction surgery.

Generally, the operating surgeon marks the patient starting at the patient's suprasternal notch, which is located approximately at the base of the neck and slightly above the sternum. The operating surgeon then measures a distance of between 19.5 cm and 25 cm, depending upon the physical size of the pre-operative subject, from the suprasternal notch towards the midpoint of the each breast for relative symmetry of each breast. This provides a reference to where the subject's nipple/areolar complex will be relocated as part of the reduction mammoplasty. The operating surgeon then attempts to form a near equilateral triangle between the subject's suprasternal notch, the post-operative left and right nipple complex locations and the left and right nipples.

The operating surgeon's goal is to transpose the nipples of the post-operative breasts to be near or at each breast's bust contour apex, yielding an aesthetically pleasing appearance.

The operating surgeon generally uses a 42 mm disk to outline the areolar portion of the nipple complex that will be relocated during the surgical process.

Further, the operating surgeon aims for a measured contour line from the inferior margin of the newly constructed areola traversing under each newly formed breast to the chest wall of 5 to 7 cm.

In the various exemplary embodiments, wherein the virtual surgeon measures and marks the subject's pre-operative VRML model using patterns similar to those used by operating surgeons, in addition to the operating guidelines above, the virtual surgeon adds an absolute line to the pre-operative subject's virtual image dropping down from the lower areola of 3 to 6 cm to the nearest point on the closest spline, depending on the subject's physical size, to the lowest point of the breast before it begins to curve toward the chest wall. As the facets and splines are volumetrically reduced, this measurement will change as the particular contour line is manipulated. In various exemplary embodiments, an end measurement result of between 5 and 7 cm indicates that the proper contour for aesthetic shape of the reduced breast has been achieved.

In various exemplary embodiments, the systems, methods, and apparatuses of this invention automatically measure and mark the subject's pre-operative VRML model in preparation for producing the forecasted breast reduction model along certain predetermined guidelines similar to those outlined above.

It should be appreciated that although FIG. 5 shows the subject's pre-operative VRML model marked with the virtual breast reduction pattern and certain of the associated measurements, including the 4.2 cm (42 mm) areole location and design pattern, the specific measurements, areole location, and design pattern used is a design choice.

Next, in Step S140, the virtual surgery procedure begins and the volume and surface area measurements of the subject's pre-operative torso are recorded. This is done by noting the volume and surface area calculations as performed by the VRML editor.

Figure 6:
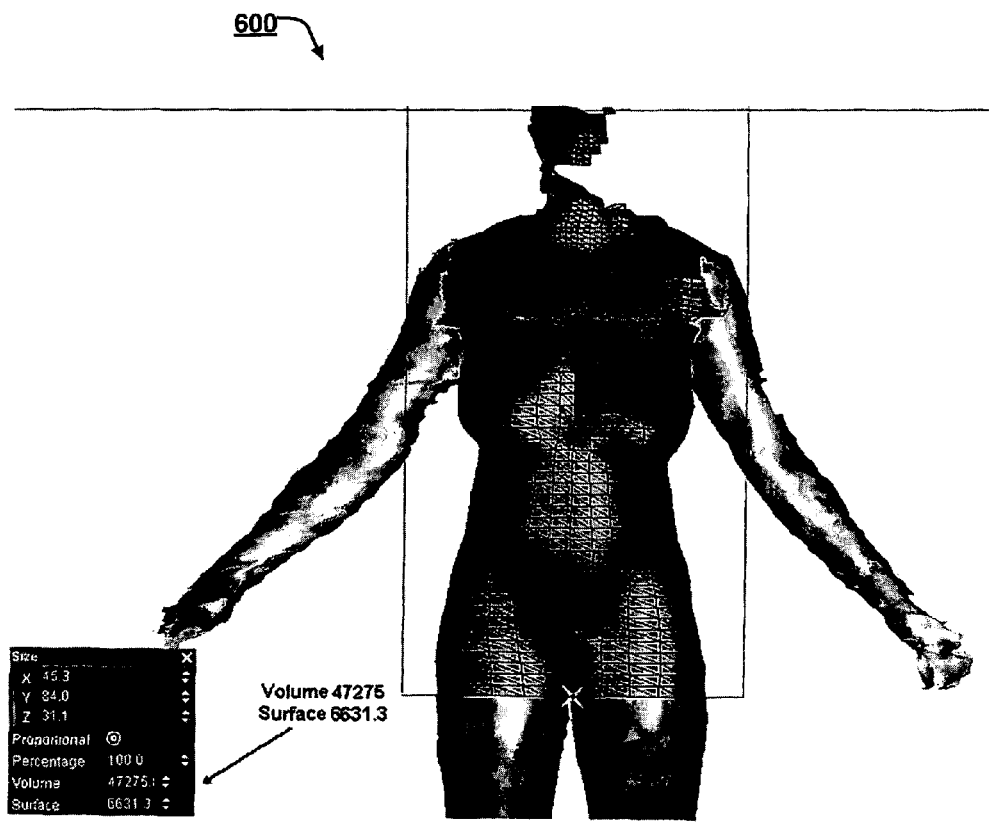
FIG. 6 shows an exemplary embodiment of the initial volume and surface area calculations prior to the virtual breast reduction process, according to this invention.

FIG. 6 shows an exemplary embodiment of the initial volume and surface area calculations prior to the virtual breast reduction process, according to this invention.

Then, in Step S145, volume reduction is performed on the pre-operative VRML model using certain stretching and shaping functions as provided by the VRML editor.

In various exemplary embodiments, the volume reduction is performed by placing the pre-operative VRML model in a supine position. Points, edges, and facets on the breasts to be reduced within the VRML structure are then selected and moved downward (negative) along the z-axis until the chest wall contour is met. Points, edges, and facets on the lateral portions of the breast are also moved along the appropriate axis as required to shape the lateral volume of the breast.

Displacing the points, edges, and facets in this manner effectively reduces the volume of the breast being manipulated within the torso. This allows the virtual surgeon to simulate location of the chest wall as the breast is being volumetrically reduced.

It should be appreciated that while the volume reduction is performed on the pre-operative VRML model, care must be taken to maintain spline alignment. Misalignment of a spline would yield a noticeable "bump" in the smoothed VRML model and would result in a distorted forecasted VRML model, resulting in inaccurate measurements.

Figure 7:
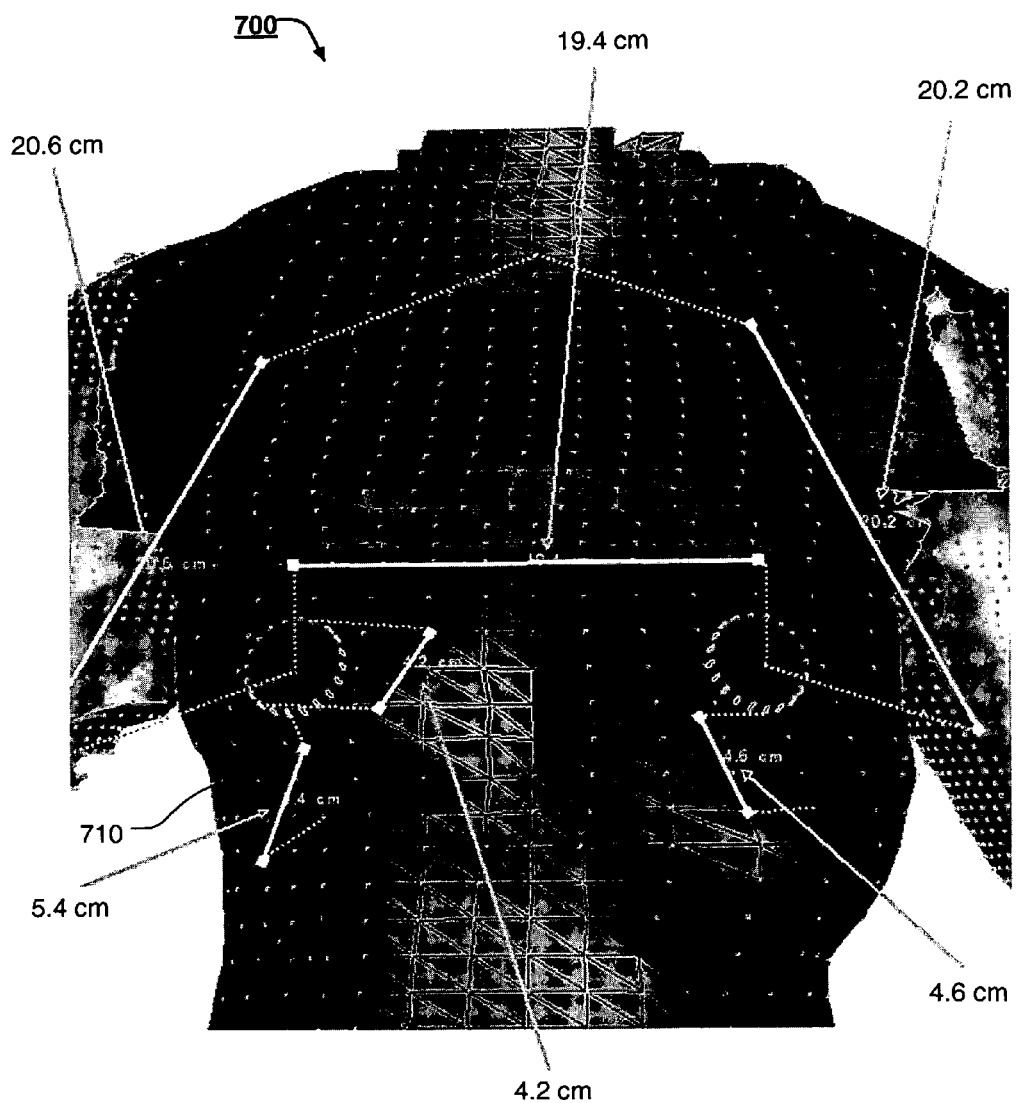
FIG. 7 shows an exemplary embodiment of the result of the VRML volumetric reduction of the right breast, with measurements, according to this invention.

FIG. 7 shows an exemplary embodiment of the result of the VRML volumetric reduction of the right breast, as an example, with measurements, according to this invention. As shown in FIG. 7, the measurement line 710 from the right breast's lower areola to the chest wall is now 5.4 cm, within the 5 to 7 cm boundary for what is considered within the practice as an aesthetically shaped reduced breast.

Figure 8:
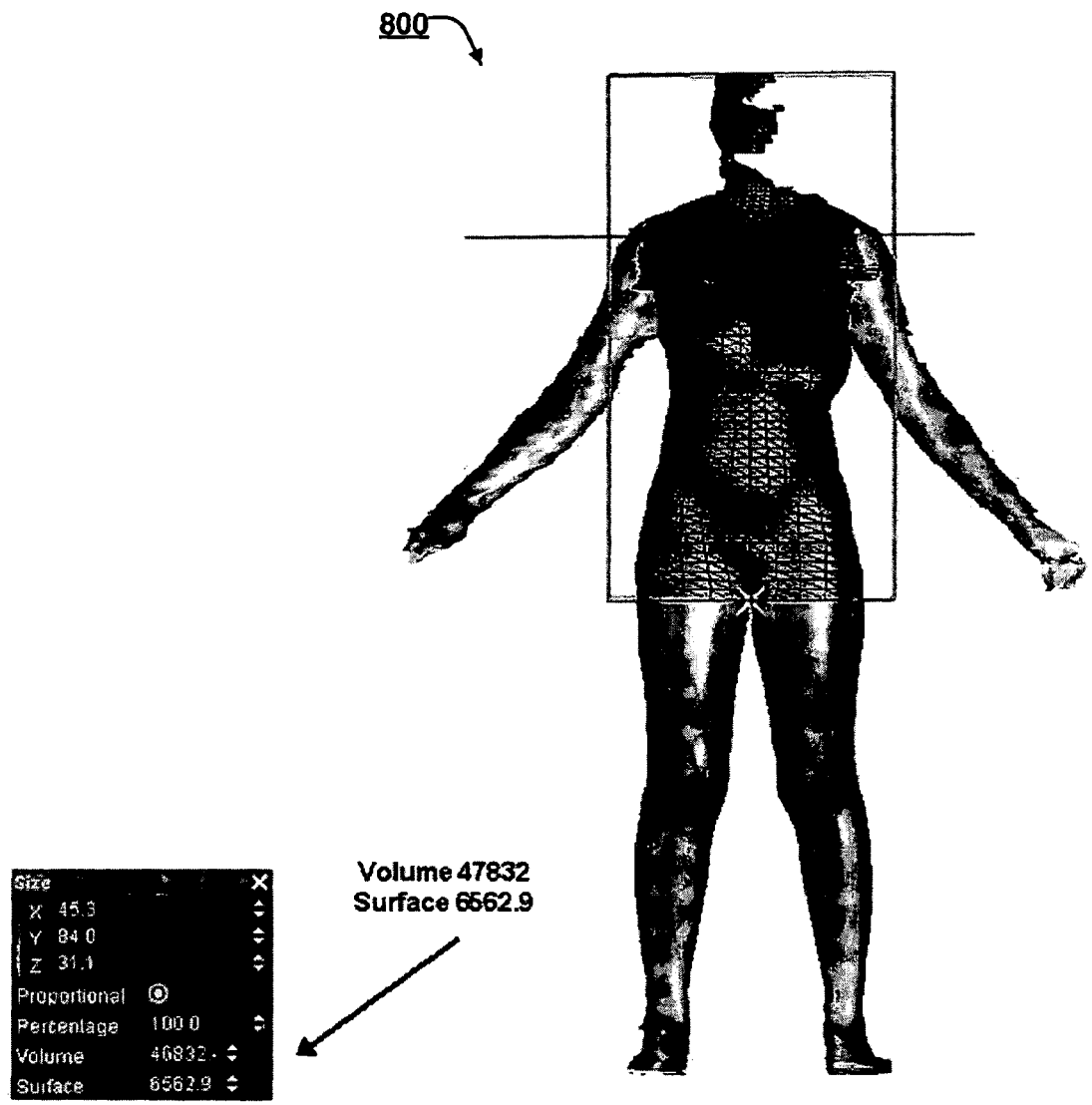
FIG. 8 shows an exemplary embodiment of the volume and surface area calculations made by the VRML editor after the right breast, as an example, has been reduced, according to this invention.

FIG. 8 shows an exemplary embodiment of the volume and surface area calculations made by the VRML editor after the right breast has been reduced. As shown in FIG. 8, the difference in volume is 413 cubic centimeters, corresponding to a guideline of approximately 413 grams of tissue to be removed from the right breast by the operating surgeon during the actual breast reduction surgical procedure.

In this exemplary embodiment, once the right breast has been reduced, the virtual breast reduction procedure is then repeated for the left breast.

Figure 9:
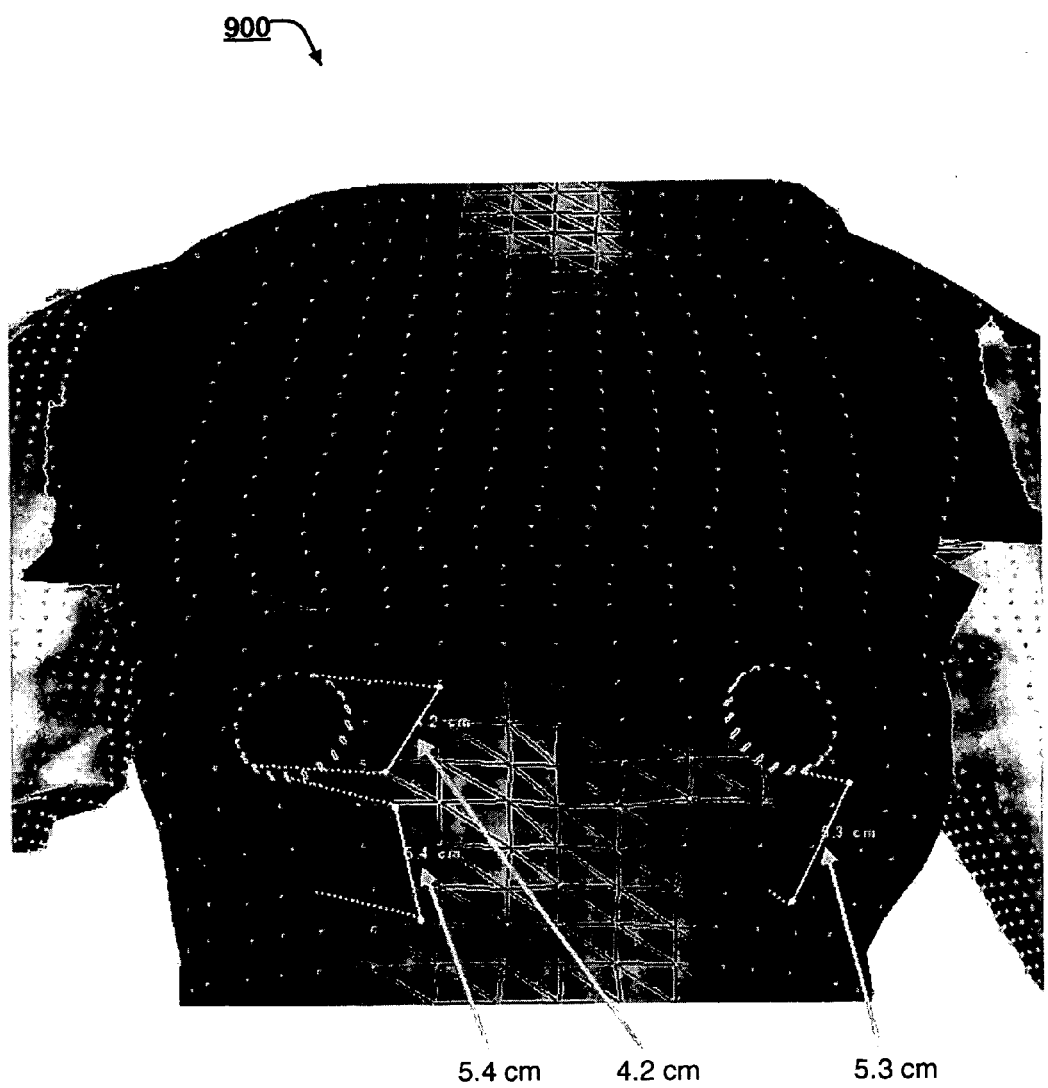
FIG. 9 shows an exemplary embodiment of the result of the VRML volumetric reduction of both breasts, as shown in a torso-highlighted polyhedric VRML model, according to this invention.

FIG. 9 shows an exemplary embodiment of the result of the VRML volumetric reduction of both breasts, as shown in a torso-highlighted polyhedric VRML model, according to this invention.

It should be appreciated that, according to various exemplary embodiments of this invention, the process of virtual breast reduction may begin at either breast. In this case, the process began with the right breast. In this example, volume and surface area calculations are noted after the right breast has been reduced to its aesthetically forecasted form. In this example, the difference in the volume of the torso, after the right breast reduction and before the left breast is reduced, is compared to the final left breast reduced state. The difference in volume in cubic centimeters acts as a guideline for the operating surgeon and closely approximates the grams of tissue to be removed from the left breast by the operating surgeon during the actual surgical procedure.

Figure 10:
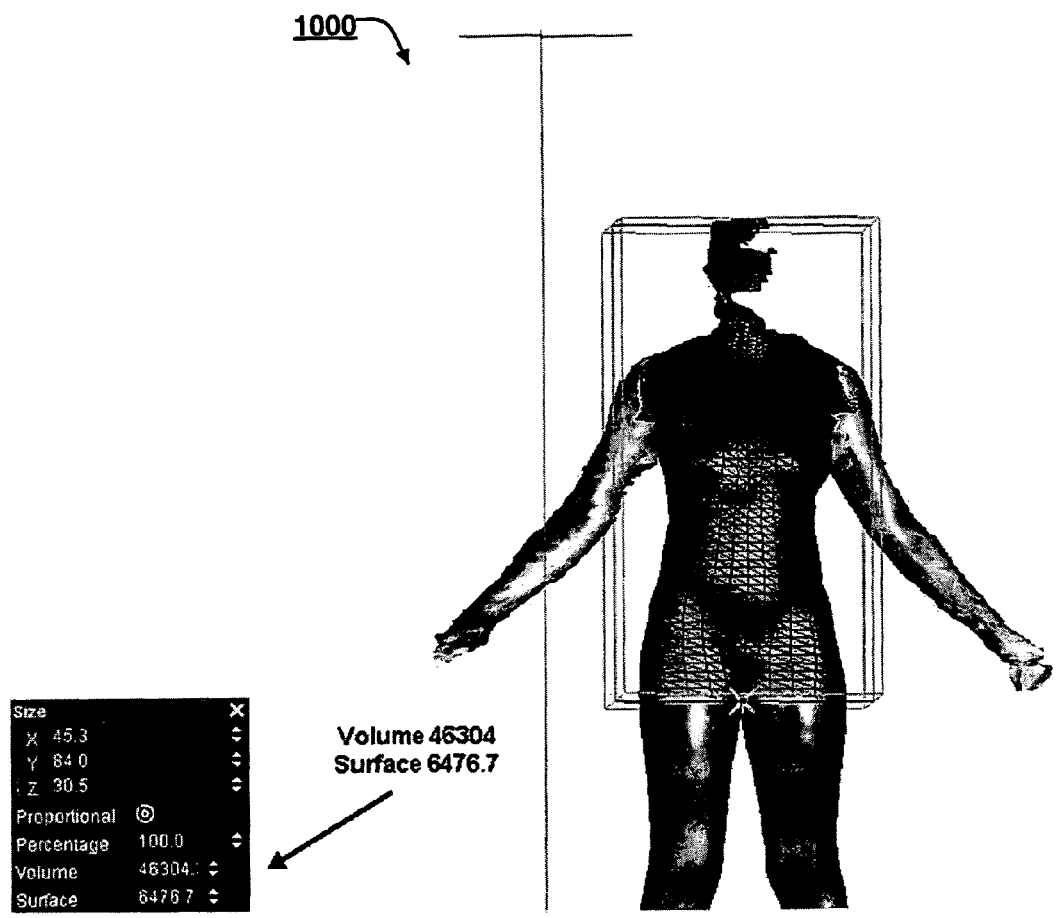
FIG. 10 shows an exemplary embodiment of the volume and surface calculations made by the VRML editor after the left breast, in this example, has been reduced, according to this invention.

FIG. 10 shows an exemplary embodiment of the volume and surface calculations made by the VRML editor after the left breast, in this exemplary embodiment, has been reduced, according to this invention. As shown in FIG. 10, the torso volume change from the end of reducing the right breast to the completion of reducing the left breast was 528 cubic centimeters. The torso volume change was calculated by subtracting the torso volume once the left breast was reduced from the final torso volume. Volumetric differences in cubic centimeters correspond to a guideline of approximately 528 grams of tissue to be removed from the left breast during the actual surgical procedure.

Once the virtual breast reduction has been completed, the method advances to Step S150, wherein the changes in volume and surface area are recorded using the calculations provided for volume and surface area by the VRML editor. In various exemplary embodiments, the difference between the torso volume prior to the virtual breast reduction process and the torso volume after the initial breast is reduced is measured in cubic centimeters. This number closely approximates the amount of tissue, in grams, that the operating surgeon is forecasted to remove from the breast during the actual surgical procedure.

The steps of performing volume reduction on the pre-operative VRML model and recording the changes in volume and surface area are repeated until the measurement from the reduced breast's relocated lower areola to the chest wall portion of the breast is between 5 and 7 cm, depending on the subject size.

Once the virtual bilateral breast reduction procedure is completed, a proposed forecasted VRML model may be created in optional step S155. Thus, a proposed forecasted VRML model may be displayed in a "smooth" mode within the VRML editor.

Figure 11:
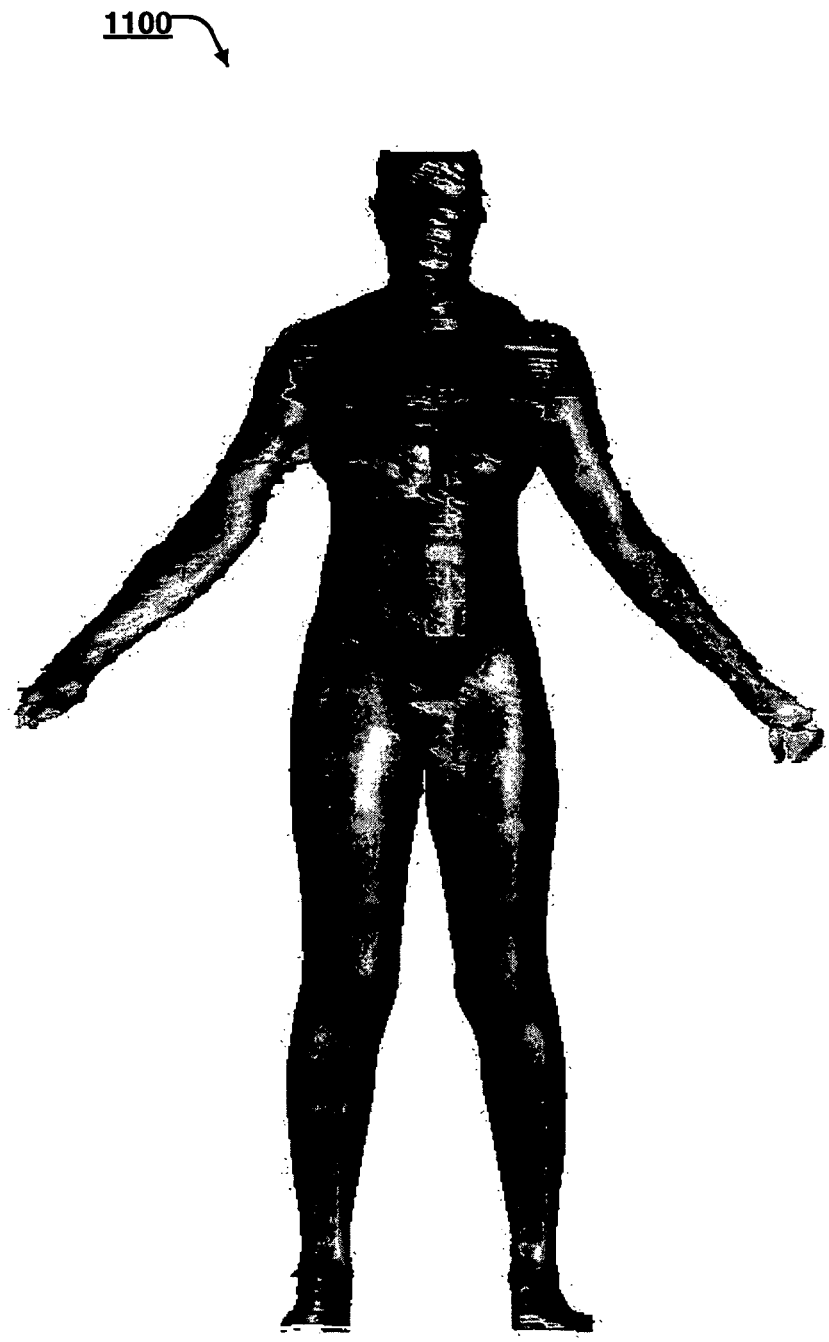
FIG. 11 shows an exemplary embodiment of a proposed forecasted model of the subject, according to this invention.

FIG. 11 shows an exemplary embodiment of a proposed forecasted VRML model of the subject, shown in "smooth" mode within the VRML editor according to this invention.

Once the changes in volume and surface area have been recorded, the method advances to step S160, wherein the forecasted VRML model is converted back to an image format that the scanner software can interpret. In various exemplary embodiments, this is accomplished using a Data Converter software program.

Once the forecasted VRML model is converted into an image format that the scanner can interpret, the method advances to step S165, wherein the specific MEP used on the pre-operative subject's scanned image is applied to the converted forecasted image and certain appropriate measurements are extracted from the converted forecasted image.

Then, in step S170, the measurements extracted from the forecasted image are compared to the pre-operative image.

FIG. 12 shows an exemplary embodiment of a forecasted breast reduction model converted to the scanner image format, with certain appropriate measurements extracted, according to this invention.

Then, in step S175, the extracted measurements from the forecasted image and the comparison measurements are stored in the subject's data archive. It should be appreciated that other data and/or information may also be included in the subject's data archive, such as, for example, post operative notes, comments, patient condition, medications administered, and any other desired data and/or information.

Once the appropriate measurements are extracted from the forecasted image, compared to the pre-operative image, and placed in the subject's data archive, the method advances to step S180, where the initial virtual surgery method ends.

Once the initial virtual surgery method ends and the appropriate measurements that were extracted from the forecasted image, compared to the pre-operative image, and placed in the subject's data archive are accessible by the actual surgeon, the actual surgery may be performed. It should be appreciated that the appropriate measurements that were extracted from the forecasted image and the pre-operative image comparative measurements may be provided to the actual surgeon as a guide for performing the actual surgery on the subject.

In various exemplary embodiments, the virtual surgeon is present during the actual operational surgical procedure. If the virtual surgeon is present during the actual operational surgical procedure, either physically or via a remote link, the forecasted VRML model may be manipulated if the operating surgeon deems necessary and deviates from the tissue removal guidelines generated by the creation of the forecasted VRML model.

Figure 13:
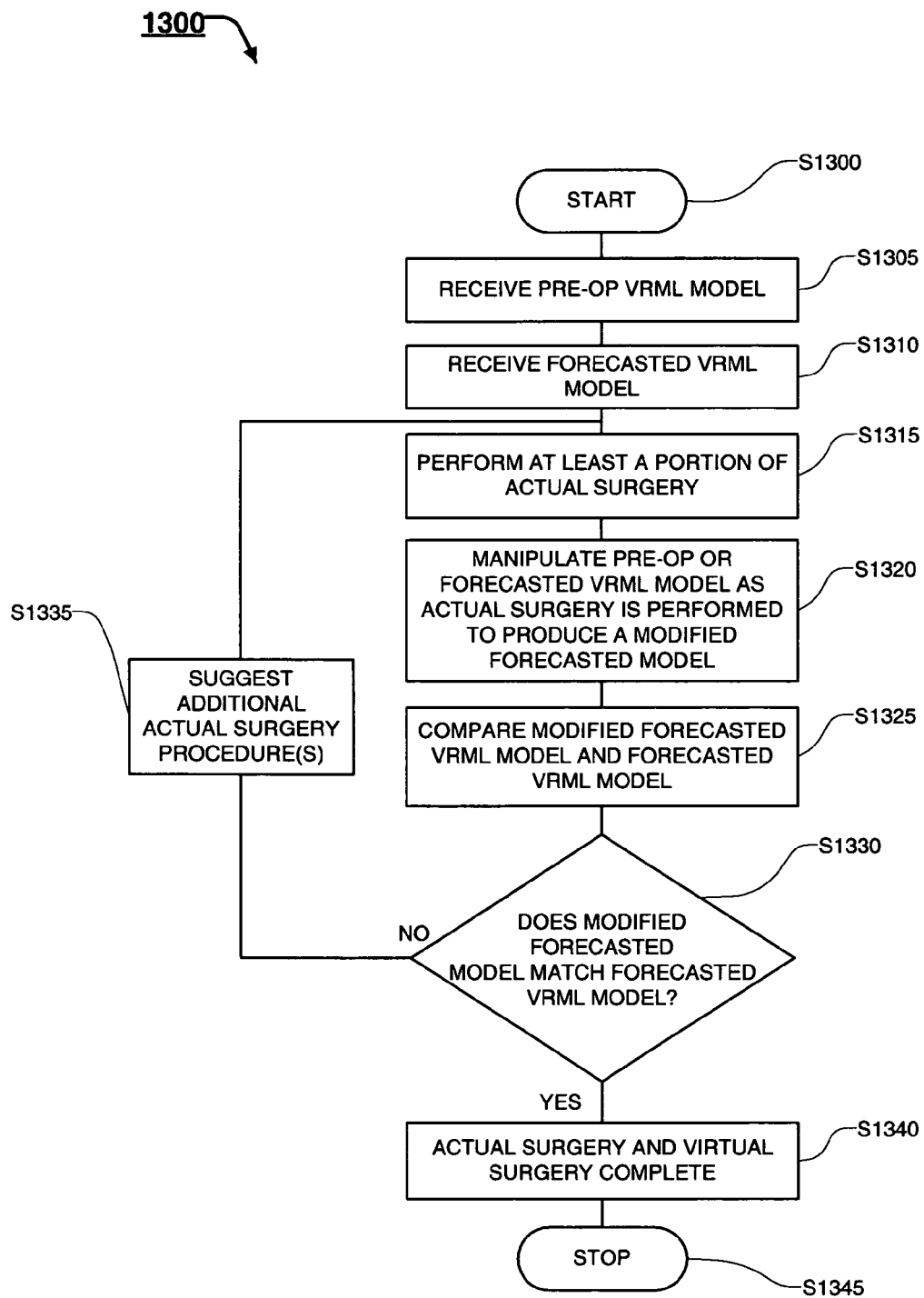
FIG. 13 shows a flowchart outlining one illustrative, non-limiting embodiment of a method for performing a virtual surgery to assist an actual surgery according to this invention.

FIG. 13 shows a flowchart 1300 outlining one illustrative, non-limiting embodiment of a method for a virtual surgeon to perform a virtual surgery to assist an actual surgeon during an actual operational surgery according to this invention.

As shown in FIG. 13, the exemplary method begins in step S1300 and continues to Step S1305 wherein the pre-operative subject's VRML model is received. It should be appreciated that certain measurements and other medical information may be received in addition to the pre-operative subject's VRML model.

Then, in Step S1310, the pre-operative subject's forecasted VRML model is received. It should be appreciated that certain measurements and other medical information may be received in addition to the pre-operative subject's forecasted VRML model.

Next, in Step S1315, at least a portion of the actual surgery is performed on the pre-operative subject. It should be appreciated that the surgery performed is a cosmetic and/or reconstructive surgical procedure, the outcome of which is forecasted by the subject's forecasted VRML model and the forecasted VRML model.

In Step S1320, the pre-operative subject's VRML model or a copy of the forecasted model is manipulated, as the portion of the actual surgery is performed, to reflect the actual changes being made to the pre-operative subject's body. Thus, as the actual surgeon performs the actual surgery, the virtual surgeon manipulates the forecasted VRML model to reflect the addition or reduction of tissue the surgeon removes from the subject.

As the virtual surgeon manipulates the subject's pre-operative VRML model or the forecasted VRML model, new volume information is produced, as well as an updated, or modified forecasted VRML model, allowing the operating surgeon to view a potential surgical outcome. The result of any manipulation of the forecasted VRML model during the actual operational surgical procedure results in a modified forecasted VRML model.

For example, as a surgeon removes 200 cubic centimeters of tissue from the subject's right breast, the pre-operative subject's VRML model is manipulated to subtract approximately 200 grams of tissue from the right breast of the subject's pre-operative VRML model. In this manner, the surgeon may view, via the real-time, modified forecasted VRML model, the results of the each step in the actual surgery and, if deemed necessary, modify the actual surgical procedure, in light of the results of the modified forecasted VRML model, to produce a better result for the subject.

It should be appreciated that the operating surgeon may also ask the virtual surgeon to explore removal or addition of tissue on the subject's pre-operative VRML model or the forecasted VRML model during the actual surgical procedure.

In Step S1325, the pre-operative subject's modified forecasted VRML model is compared to the received forecasted VRML model. It should be appreciated that certain measurements and other medical information may be compared between the pre-operative subject's modified forecasted VRML model and the received forecasted VRML model.

In various exemplary embodiments, the pre-operative subject's modified forecasted VRML model is compared to the received forecasted VRML model by first converting the modified forecasted VRML model into a format that the scanner software can interpret using a data converter software program.

Once the modified forecasted VRML model is converted into a format that the scanner can interpret, the specific MEP used to measure the pre-operative scanned image is applied to extract measurements from the modified forecasted VRML model. The measurements extracted from the modified forecasted VRML model are then compared to the measurements extracted from the pre-operative scanned image and the forecasted VRML model.

This can be performed during the actual operational procedure, allowing the operating surgeon to understand probable post-operative subject body contour measurements.

In Step S1330, a determination is made as to whether at least a relevant portion of the pre-operative subject's modified forecasted VRML model matches the received forecasted VRML model. It should be appreciated that determination may be based upon certain of the measurements and other medical information that is included with the pre-operative subject's modified forecasted VRML model and the received forecasted VRML model.

It should also be appreciated that, in certain exemplary embodiments, the pre-operative subject's modified forecasted VRML model will not be required to match the received forecasted VRML model exactly in order for a match to be determined. Certain acceptable parameters may be established such that an exact match is not required.

If, in Step S1330, it is determined that the relevant portion of the pre-operative subject's modified forecasted VRML model does not match the received forecasted VRML model, the method advances to Step S1335.

In Step S1335, certain suggestions may be provided to propose possible procedures to be performed such that the subject's body will more closely match the forecasted VRML model. These suggestions may be provided as a VRML or other image or may be provided as measurement, weight, or volume information.

When the suggestions have been provided, the method returns to Step S1315, and a further portion of the actual surgery is performed on the pre-operative subject. It should be appreciated that the operating surgeon may elect to utilize the new suggestions or guidelines, or discard them.

It should also be appreciated that in various exemplary embodiments, Step S1335 is not included. In these exemplary embodiments, if it is determined in Step S1330 that the relevant portion of the pre-operative subject's modified forecasted VRML model does not match the received forecasted VRML model, the method returns to Step S1315, and a further portion of the actual surgery is performed on the pre-operative subject, without any provided suggestions.

If, in Step S1330, it is determined that the relevant portion of the pre-operative subject's modified forecasted VRML model does match the received forecasted VRML model, the method advances to Step S1340.

In Step S1340, both the actual surgery in the companion virtual surgery are complete.

The method then advances to S1345 and the method for a virtual surgeon to perform a virtual surgery to assist an actual surgeon during the actual operational surgery ends.

It should be appreciated that the surgeon may elect, if deemed necessary, to end the actual operational surgery before, for example, a point when the relevant portion of the pre-operative subject's modified forecasted VRML model matches the actual surgical data. Thus, terminating the actual surgery before the amount of tissue or fluid predicted by the pre-operative subject's forecasted VRML model or the pre-operative subject's modified forecasted VRML model. If this occurs, the final modified forecasted VRML model may be manipulated to reflect to results of the actual surgical procedure and the actual surgical data.

Conversely, it should be appreciated that the surgeon may elect, if deemed necessary, to continue the actual operational surgery beyond, for example, a point when the relevant portion of the pre-operative subject's modified forecasted VRML model matches the actual surgical data. Thus, continuing the actual surgery and removing an additional amount of tissue or fluid beyond what was predicted by the pre-operative subject's forecasted VRML model or the pre-operative subject's modified forecasted VRML model. If this occurs, the final modified forecasted VRML model may be manipulated to reflect to results of the actual surgical procedure and the actual surgical data.

It should also be appreciated that the pre-operative subject's data archive, if established, may be updated to include information and/or images for each iteration of the actual and virtual surgery procedure. Thus, the subject's pre-operative image, forecasted VRML model, modified forecasted VRML model (if any), and post-operative scanned image may be included in the subject's data archive. Likewise, measurements extracted from the subject's pre-operative scanned image, forecasted VRML model, modified forecasted VRML model (if any), actual surgical data, and post-operative scanned image may also be included in the subject's data archive. In this manner, the images, models, and/or measurements may be formatted, compared, and analyzed, documented, and commented upon. In turn, information regarding the formatting, comparison, analysis, documentation, and/or comments may also be placed in the subject's data archive.

Figure 14:
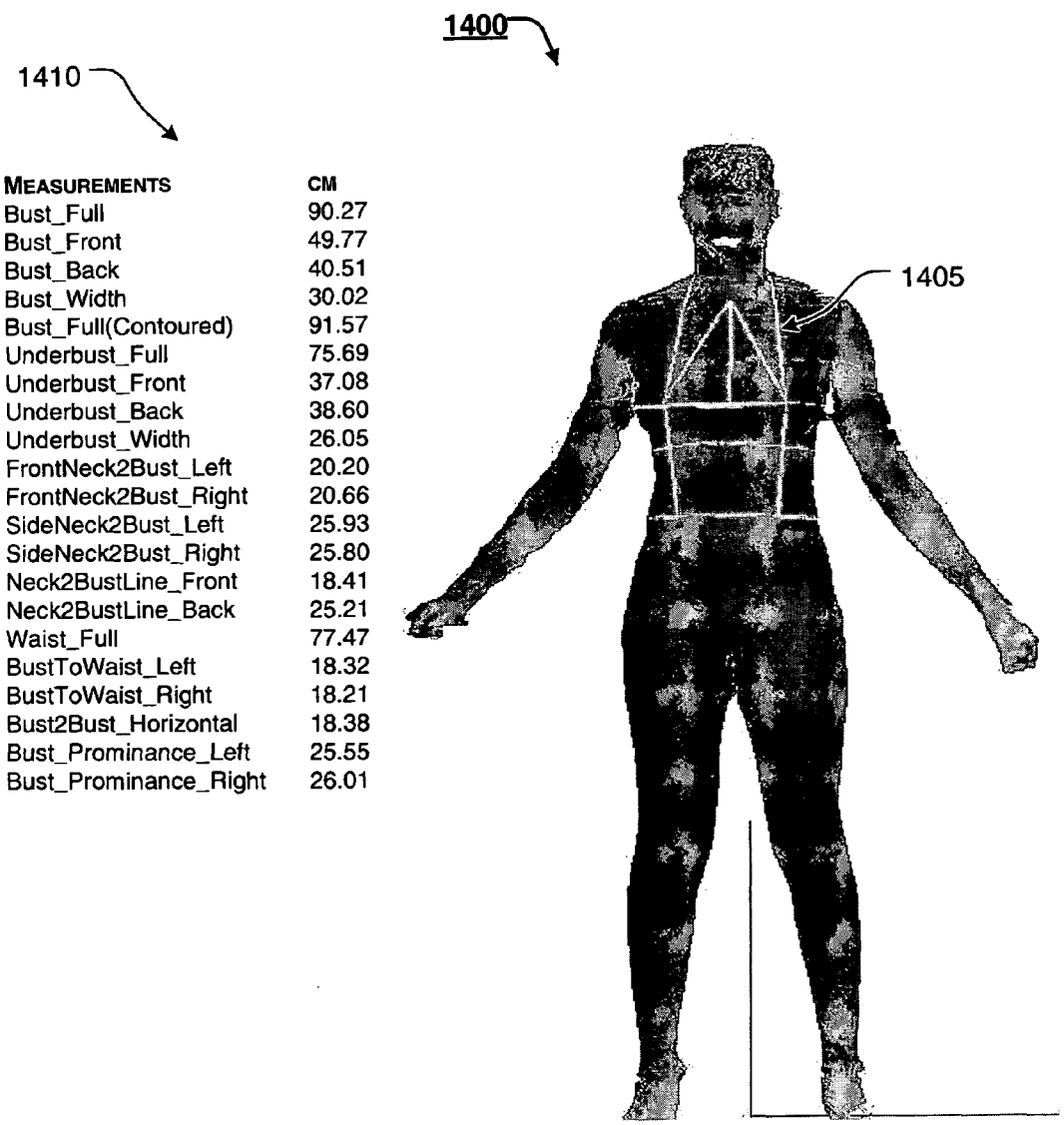
FIG. 14 shows an exemplary embodiment of a 1 month post-operative subject scan and associated measurements, according to this invention.

After an actual operational surgical procedure is performed on a subject, the subject may then be scanned post-operatively, often on a periodic, repetitive basis. FIG. 14 shows an exemplary embodiment of a 1-month post-operative subject scan and associated measurements, according to this invention.

Once a post-operative scan is acquired, a specific MEP is applied to extract measurements from the subject's post-operative scanned image. In various exemplary embodiments, the specific MEP used is the specific MEP that was used to measure the subject's pre-operative scanned image, forecasted VRML model, and modified forecasted VRML model (if any).

It should be appreciated that any post-operative scan(s) and any measurements of other information associated with any post-operative scan(s) may also be included in the subject's data archive.

In various exemplary embodiments, information from the subject's data archive may also be used to build future forecasted VRML models for other breast reduction surgery subjects.

As shown in FIG. 14, the exemplary subject's 1-month post-operative scan and associated measurements show that as a result of the actual surgical procedure, 435 grams of actual tissue were surgically removed from the subject's right breast and 535 grams of actual tissue were surgically removed from the subject's left breast. In this example, the subject's forecasted VRML model predicted that 413 grams of tissue would be removed from the subject's right breast and 528 grams of tissue would be removed from the subject's left breast.

FIG. 15 shows an exemplary embodiment of a measurement comparison table 1500 for the subject's pre-operative scan, forecasted model image, and 1-month post-operative scan, according to this invention.

A field associated with each measurement allows comments to be inserted by, for example, the operating surgeon, the virtual surgeon, and/or a technician.

The interpretation of any surgical outcome is greatly enhanced by simultaneously viewing the subject's pre-operative scan image, the forecasted VRML model, any modified forecasted VRML model(s), and any post-operative scan image(s) simultaneously, at known angles.

In various exemplary embodiments, the VRML models for the subject's pre-operative scan image, forecasted VRML model, modified forecasted VRML model (if any), and post-operative scan image are merged into a single VRML file, and spaced and annotated accordingly. The composite file is read into a software program that allows the composite file to be manipulated.

Lighting effects may be applied within a software program to highlight ambience, lighting direction, and light intensity, with appropriate shadow casting.

The equivalent of an isometric camera is then applied to view the composite image. An isometric camera views the scene from a plane rather than a point, eliminating any perspective distortions. In an isometric view, object size is not related to distance from the camera, every edge appears the size it actually is, and parallel lines appear parallel instead of tapering as they would if using a perspective view.

Figure 16:
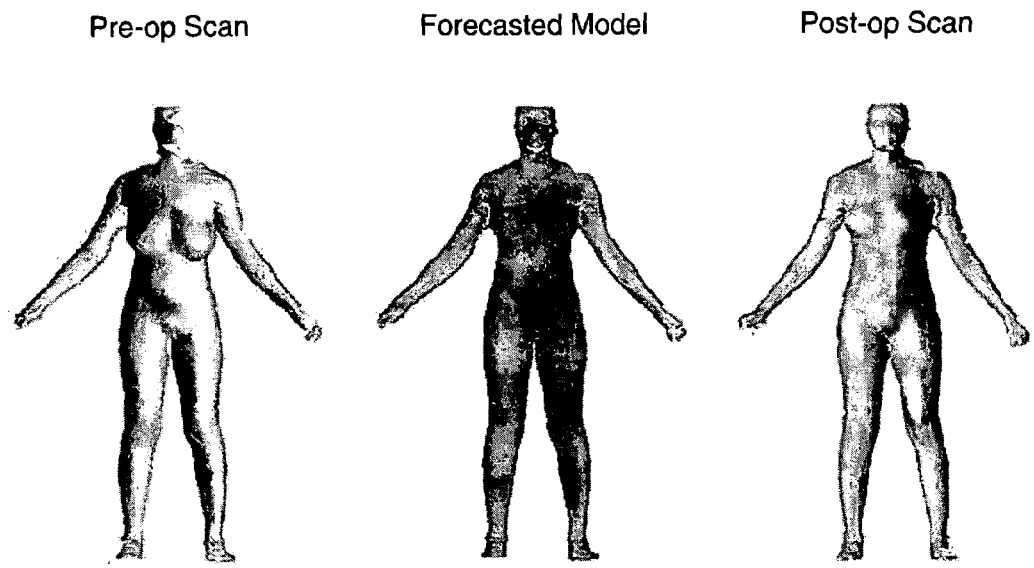
FIG. 16 shows an exemplary embodiment of a composite front view of a pre-operative, forecasted, and post-operative image of the subject, according to this invention.
Figure 17:
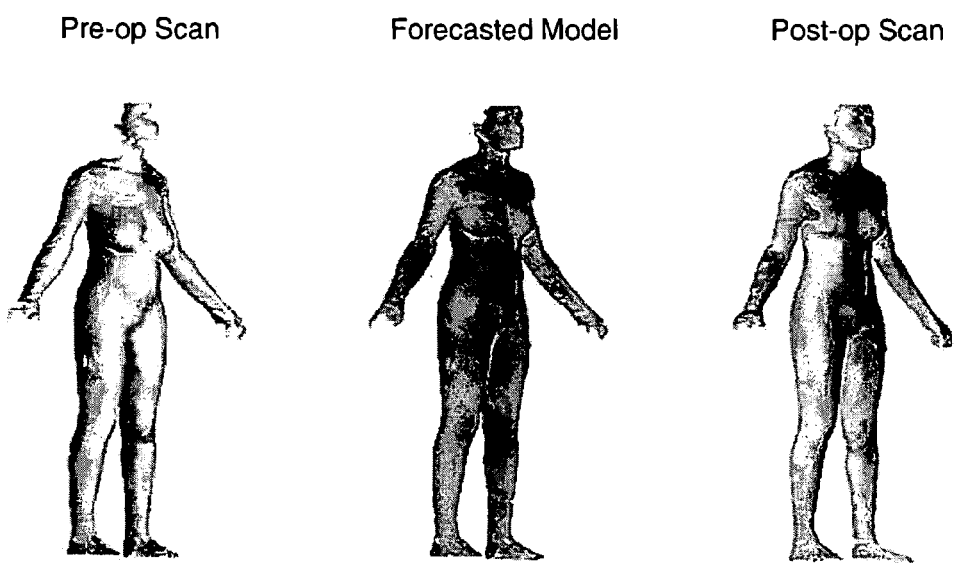
FIG. 17 shows an exemplary embodiment of a composite view of the pre-operative, forecasted, and post-operative image of the subject rotated 45 degrees, according to this invention.
Figure 20:
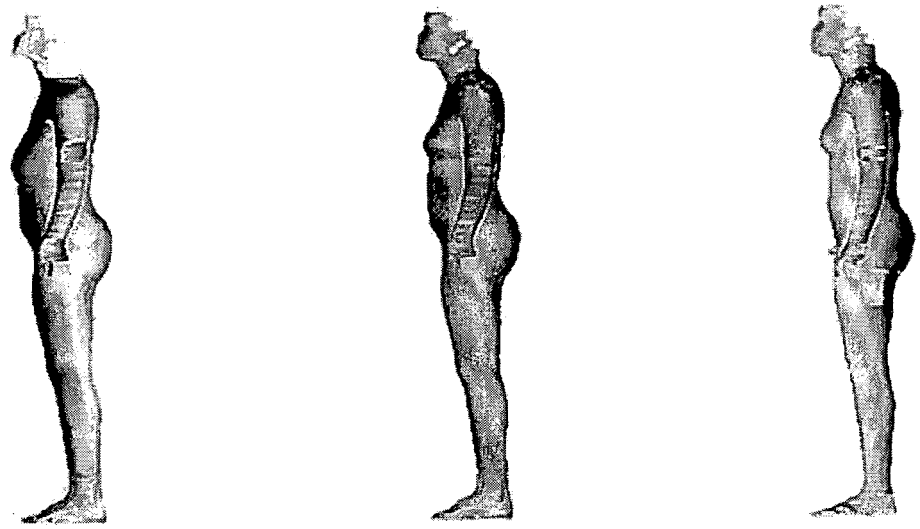
FIG. 20 shows an exemplary embodiment of a composite view of the pre-operative, forecasted, and post-operative image of the subject rotated 270 degrees, according to this invention.
Figure 21:
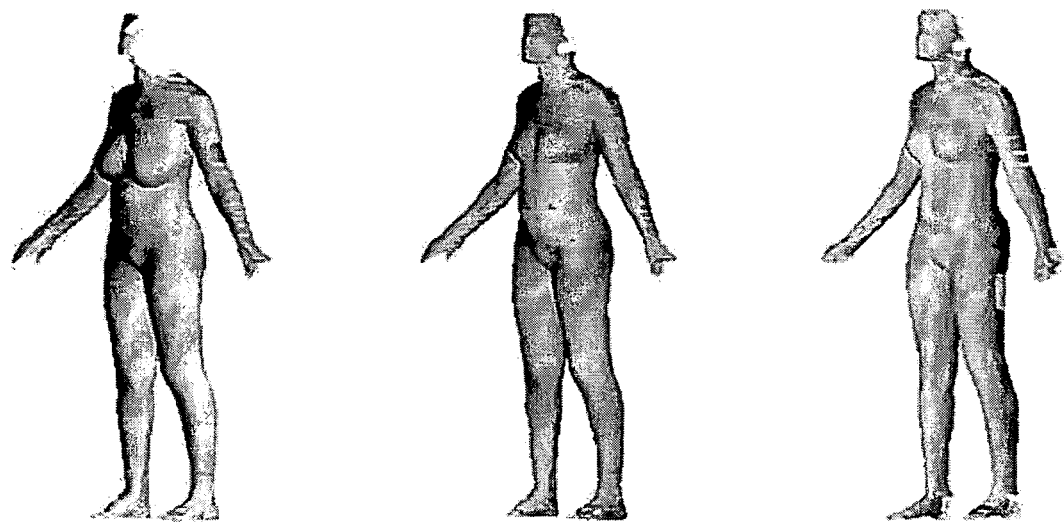
FIG. 21 shows an exemplary embodiment of a composite view of the pre-operative, forecasted, and post-operative image of the subject rotated 315 degrees, according to this invention.

A series of images are then rendered from the composite VRML file. In one exemplary embodiment, the images created include a composite frontal view of the subject's pre-operative, forecasted, and post-operative images (as shown in FIG. 16), the composite images rotated 45 degrees (as shown in FIG. 17), wherein all components are rotated 45 degrees and the left half-side of each image is highlighted, the composite images rotated 90 degrees (as shown in FIG. 18), wherein all components are rotated 90 degrees and the left side profile of each image is highlighted, the composite images rotated 180 degrees (shown in FIG. 19), where all components are rotated 180 degrees and the back side of each image is highlighted, the composite images rotated 270 degrees (as shown in FIG. 20), where all components are rotated 270 degrees and the right side of each image is highlighted, and the composite images rotated 315 degrees (as shown in FIG. 21), where all components are rotated 315 degrees and the right half-side of each image is highlighted.

Each created, composite image may be stored in the subject's data archive. Printouts of these images or discs including the may be given to the subject, or may be stored in a tangible form in the subject's conventional medical and/or maintenance file.

While this invention has been described in conjunction with the exemplary embodiments outlined above, it is evident that many alternatives, modifications, and variations will be apparent to those skilled in the art. For example, the embodiments of this invention have been described with reference to the prediction, evaluation, and validation of an exemplary breast reduction surgical procedure. However, it should be appreciated that the virtual surgery systems and methods of this invention may be utilized in various other cosmetic and reconstructive surgical procedures. Such adaptations and modifications should and are intended to be comprehended within the meaning and range of equivalents of the disclosed exemplary embodiments.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A computer based method for providing measurements to be used during a surgical procedure, comprising:
   receiving, on a computer, a three-dimensional, surface scan image of at least a portion of a pre-operative subject's body, wherein the three-dimensional, surface scan image is of an exterior surface of the at least portion of a pre-operative subject's body;
   applying a predetermined measurement extraction profile to the pre-operative subject's surface scan image to extract at least some measurements from the pre-operative subject's surface scan image;
   determining, via a computer, using the measurement extraction profile, at least some measurements from the pre-operative subject's surface scan image;
   converting, via a computer, the subject's pre-operative surface scan image from the surface scan image format to a pre-operative model format to produce a pre-operative model, wherein the pre-operative model may be manipulated by a native three-dimensional data modeling language;
   applying a procedure-specific template to the pre-operative model;
   manipulating at least a portion of a surface of the subject's pre-operative model, by using stretching and shaping functions, based on the procedure-specific template, to produce a forecasted model;
   determining, via a computer, changes in volume and surface area measurements between the subject's pre-operative model and the forecasted model;
   recording at least some of the volume and surface area measurements and the determined volume and surface area measurements in a data archive for the subject;
   converting the forecasted model to a converted forecasted image, wherein the converted forecasted image is in an image format that a scanner software can interpret;
   displaying, via a computer, the forecasted image;
   applying the predetermined measurement extraction profile to the converted forecasted image;
   extracting at least some surface measurements from the converted forecasted image;
   comparing, via a computer, at least some of the measurements extracted from the converted forecasted image to corresponding measurements extracted from the pre-operative image to produce comparison measurements;
   recording at least some of the extracted surface measurements from the forecasted image and the comparison measurements in the data archive for the subject; and
   presenting, via a computer, the comparison measurements prior to the performance of the surgical procedure, wherein the comparison measurements show the amount of tissue to be added or removed.

2. The method of claim 1, wherein the surface scan image is a highly accurate, dimensionally correct, three-dimensional image of the pre-operative subject's body.

3. The method of claim 1, wherein a white light scanner, a laser, an ultrasonic imager, or an equivalent device is used to produce the surface scan image of the pre-operative subject's body.

4. The method of claim 1, wherein the measurements include circumferential measurements of the pre-operative subject's breasts, waist, hips, abdomen, and stomach.

5. The method of claim 1, wherein the measurements include certain linear measurements of the pre-operative subject's body chest, bust, underbust, waist, hips, abdomen, and stomach.

6. The method of claim 1, wherein manipulating comprises moving, on the subject's pre-operative model, the subject's left nipple complex to a post-operative left nipple complex location and the subject's right nipple complex to a post-operative right nipple complex location.

7. The method of claim 6, wherein the post-operative left nipple complex location is approximately between 19.5 cm and 25 cm from the subject's suprasternal notch, wherein the post-operative right nipple complex location is approximately between 19.5 cm and 25 cm from the subject's suprasternal notch, and wherein the subject's respective nipple complexes are moved towards a midpoint, for relative symmetry of each of the subject's respective breasts.

8. The method of claim 1, wherein manipulating comprises performing a volume reduction on at least one of the subject's breasts on the pre-operative model to produce a forecasted model.

9. The method of claim 8, wherein performing a volume reduction includes using certain stretching and shaping functions as provided by a native three-dimensional data modeling language.

10. The method of claim 8, wherein performing a volume reduction comprises:
    placing the pre-operative model in a supine position;
    selecting and moving appropriate points, edges, and facets on at least one of the breasts to be reduced within the model downward along a z-axis until a desired chest wall contour is met; and
    selecting and moving appropriate points, edges, and facets on the lateral portions of at least one of the breasts to be reduced within the model along an appropriate axis as required to reduce the lateral breast volume and shape the breast to a desired level.

11. The method of claim 8, wherein spline alignment is maintained after the volume reduction is performed on the pre-operative model.

12. The method of claim 1, wherein changes in volume and surface area are determined in cubic centimeters.

13. The method of claim 1, wherein changes in volume and surface area are determined using a native three-dimensional data modeling language.

* * * * *